(12) United States Patent
Uetake et al.

(10) Patent No.: US 10,960,682 B2
(45) Date of Patent: Mar. 30, 2021

(54) IMAGE RECORDING APPARATUS AND IMAGE RECORDING METHOD

(71) Applicant: RICOH COMPANY, LTD., Tokyo (JP)

(72) Inventors: Kazuyuki Uetake, Shizuoka (JP); Yoshihiko Hotta, Shizuoka (JP); Ichiro Sawamura, Shizuoka (JP); Tomomi Ishimi, Shizuoka (JP); Yasuroh Yokota, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 331 days.

(21) Appl. No.: 16/045,044

(22) Filed: Jul. 25, 2018

(65) Prior Publication Data
US 2018/0326745 A1 Nov. 15, 2018

Related U.S. Application Data

(63) Continuation of application No. PCT/JP2017/003672, filed on Feb. 1, 2017.

(30) Foreign Application Priority Data

Feb. 5, 2016 (JP) .............................. JP2016-021357
Jan. 31, 2017 (JP) .............................. JP2017-015766

(51) Int. Cl.
*B41J 2/47* (2006.01)
*B41J 2/46* (2006.01)
(Continued)

(52) U.S. Cl.
CPC ................. *B41J 2/473* (2013.01); *B41J 2/46* (2013.01); *B41J 2/4753* (2013.01); *B41J 11/008* (2013.01);
(Continued)

(58) Field of Classification Search
None
See application file for complete search history.

(56) References Cited

U.S. PATENT DOCUMENTS

| 5,453,777 A | 9/1995 | Pensavecchia et al. |
| 5,666,447 A | 9/1997 | Chuang et al. |
(Continued)

FOREIGN PATENT DOCUMENTS

| CN | 101032879 A | 9/2007 |
| CN | 101073953 A | 11/2007 |
(Continued)

OTHER PUBLICATIONS

International Search Report dated Apr. 18, 2017 in PCT/JP2017/003672 filed Feb. 1, 2017 (with English Translation).
(Continued)

*Primary Examiner* — Jennifer D. Carruth
(74) *Attorney, Agent, or Firm* — Xsensus LLP

(57) ABSTRACT

An image recording apparatus includes: a laser emitting device configured to emit laser beams emitted from a plurality of laser light-emitting elements; an optical fiber array including a plurality of optical fibers provided corresponding to the laser light-emitting elements and configured to guide the laser beams emitted from the laser light-emitting elements to a recording object that relatively moves with respect to the laser emitting device, laser emitting portions of the respective optical fibers being arrayed in an array form in a predetermined direction; and an image recording unit configured to control the laser emitting device so as to irradiate the recording object which relatively moves with respect to the laser emitting device in a direction different from the predetermined direction, with laser beams via the optical fiber array, to heat the recording object and record an image.

10 Claims, 7 Drawing Sheets

(51) Int. Cl.
*B41J 2/475* (2006.01)
*B41J 11/00* (2006.01)
*G02B 6/42* (2006.01)
*H04N 1/053* (2006.01)
*H04N 1/06* (2006.01)
*H04N 1/50* (2006.01)

(52) U.S. Cl.
CPC ............ *G02B 6/4249* (2013.01); *H04N 1/053* (2013.01); *H04N 1/0685* (2013.01); *H04N 1/506* (2013.01)

(56) References Cited

U.S. PATENT DOCUMENTS

| | | | |
|---|---|---|---|
| 6,480,220 B1 * | 11/2002 | Tamaki | B41J 2/46 347/241 |
| 6,522,350 B2 | 2/2003 | Inoue et al. | |
| 7,944,463 B2 * | 5/2011 | Toyama | G03G 15/50 347/243 |
| 8,284,226 B2 | 10/2012 | Hasegawa et al. | |
| 8,546,300 B2 | 10/2013 | Uchimura | |
| 9,987,856 B2 * | 6/2018 | Sawamura | B41J 3/4073 |
| 10,556,446 B2 * | 2/2020 | Sawamura | B41J 2/455 |
| 2002/0012153 A1 | 1/2002 | Sunagawa | B41J 19/16 359/204.1 |
| 2002/0015088 A1 | 2/2002 | Inoue et al. | |
| 2003/0142194 A1 | 7/2003 | Inoue et al. | |
| 2004/0032483 A1 * | 2/2004 | Itabashi | B41J 2/473 347/238 |
| 2007/0268356 A1 | 11/2007 | Murakami et al. | |
| 2008/0192618 A1 | 8/2008 | Nakata et al. | |
| 2010/0039916 A1 | 2/2010 | Hasegawa et al. | |
| 2011/0177941 A1 | 7/2011 | Uchimura | |
| 2012/0188328 A1 | 7/2012 | Takezawa | |
| 2013/0135425 A1 | 5/2013 | Yamamoto | |
| 2013/0141512 A1 | 6/2013 | Asai et al. | |
| 2014/0152756 A1 | 6/2014 | Ishikake et al. | |
| 2014/0285606 A1 * | 9/2014 | Ishimi | B41J 2/315 347/179 |
| 2016/0279968 A1 | 9/2016 | Ishimi et al. | |

FOREIGN PATENT DOCUMENTS

| | | |
|---|---|---|
| CN | 101648467 A | 2/2010 |
| CN | 102152681 A | 7/2011 |
| JP | 07-023195 | 1/1995 |
| JP | 10-324021 | 12/1998 |
| JP | 2002-273919 | 9/2002 |
| JP | 2002273922 A | 9/2002 |
| JP | 2008-194905 | 8/2008 |
| JP | 2010-052350 | 3/2010 |
| JP | 2012-155135 | 8/2012 |
| JP | 2013-111888 | 6/2013 |
| JP | 2013-116599 | 6/2013 |
| JP | 2014-128970 | 7/2014 |
| JP | 2014-133352 | 7/2014 |
| JP | 2014-208454 | 11/2014 |

OTHER PUBLICATIONS

Written Opinion dated Apr. 18, 2017 in PCT/JP2017/003672 filed Feb. 1, 2017.

Notification of First Action dated Apr. 25, 2019, issued in corresponding Chinese Application No. 201780009170.8, 17 pages (with English Translation).

* cited by examiner

IMAGE RECORDING APPARATUS AND IMAGE RECORDING METHOD

CROSS-REFERENCE TO RELATED APPLICATIONS

The present application is a continuation application of International Application No. PCT/JP2017/003672, filed Feb. 1, 2017, which claims priority to Japanese Patent Application No. 2016-021357, filed Feb. 5, 2016, and Japanese Patent Application No. 2017-015766, filed Jan. 31, 2017. The contents of these applications are incorporated herein by reference in their entirety.

BACKGROUND OF THE INVENTION

1. Field of the Invention

The present invention relates to an image recording apparatus and an image recording method.

2. Description of the Related Art

Conventionally, known has been an image recording apparatus that records a visible image on a recording object by irradiating the recording object with a laser and heating the recording object.

As for the above-described image recording apparatus, for example, Japanese Patent Application Laid-open No. 2010-052350 describes an image recording apparatus including a laser emitting device such as a laser array in which a plurality of semiconductor lasers that are laser light-emitting elements are arranged in an array form and in which laser beams emitted from the respective semiconductor lasers irradiate positions different from one another in a predetermined direction. Then, the image recording apparatus described in Japanese Patent Application Laid-open No. 2010-052350 irradiates with the laser a recording object that relatively moves to a direction different from the above-described predetermined direction with respect to the laser emitting device, and it records a visible image on the recording object.

A semiconductor laser generates heat when emitting a laser. In the image recording apparatus described in the foregoing Japanese Patent Application Laid-open No. 2010-052350, there is a need to array the semiconductor lasers so that a pitch of image dots in a main-scanning direction formed by the irradiation of the laser is a prescribed pitch. Thus, in the image recording apparatus described in Japanese Patent Application Laid-open No. 2010-052350, the array pitch of the semiconductor lasers is narrow, and the heat of the semiconductor lasers is hard to escape. As a result, in the image recording apparatus described in Japanese Patent Application Laid-open No. 2010-052350, there has been a problem in that the temperature of the semiconductor lasers rises and that the wavelength and optical output of the semiconductor lasers fluctuate, making it no longer possible to obtain a satisfactory image.

SUMMARY OF THE INVENTION

According to one aspect of the present invention, an image recording apparatus includes a laser emitting device, an optical fiber array, and an image recording unit. The laser emitting device is configured to emit laser beams emitted from a plurality of laser light-emitting elements. The optical fiber array includes a plurality of optical fibers provided corresponding to the laser light-emitting elements and is configured to guide the laser beams emitted from the laser light-emitting elements to a recording object that relatively moves with respect to the laser emitting device, laser emitting portions of the respective optical fibers being arrayed in an array form in a predetermined direction. The image recording unit is configured to control the laser emitting device so as to irradiate the recording object which relatively moves with respect to the laser emitting device in a direction different from the predetermined direction, with laser beams via the optical fiber array, to heat the recording object and record an image.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
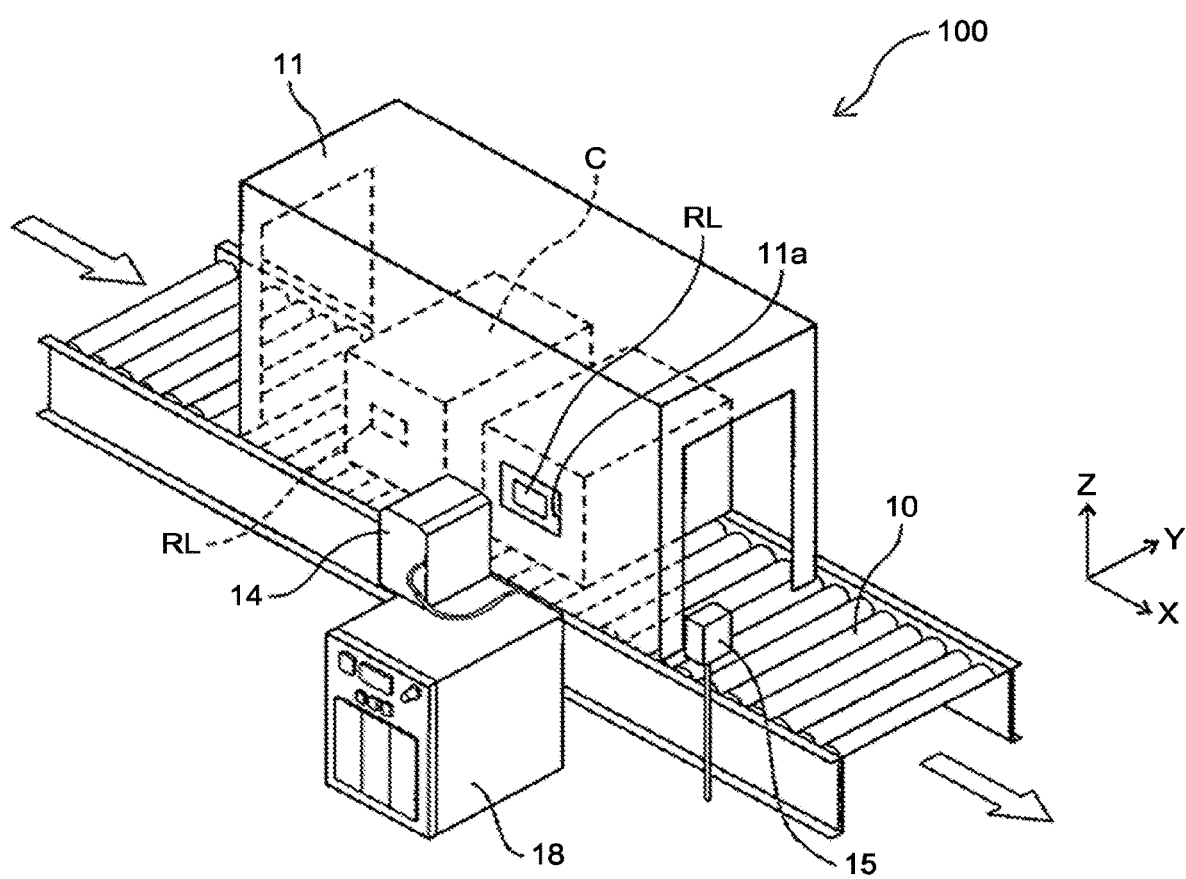
FIG. 1 is a schematic perspective view of an image recording system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment has an object to provide an image recording apparatus and an image recording method capable of suppressing a rise in temperature of a laser light-emitting element.

The following describes an exemplary embodiment of an image recording apparatus to which the present invention was applied. The image recording apparatus records an image by irradiating a recording object with a laser beam.

The image is not particularly limited as long as it is visible information, and it can be selected as appropriate depending on the purpose. Examples of the image include a character, a symbol, a line, a graphic, a solid image, a combination of the foregoing, a two-dimensional code such as a barcode and a QR code (registered trademark), and the like.

The recording object is not particularly limited as long as it can be recorded by a laser beam, and it can be selected as appropriate depending on the purpose. The recording object may be anything as long as it is capable of absorbing light, converting it to heat, and forming an image, and marking on a metal or the like is also included, for example. Examples of the recording object include a thermosensitive recording medium, a structure having a thermosensitive recording portion, and the like.

The thermosensitive recording medium includes a supporting member, and an image recording layer on the supporting member, and further includes other layers as needed. Each of the layers may be in a single layer structure or a layered structure, and it may further be provided on the other surface of the supporting member.

Image Recording Layer

The image recording layer contains a leuco dye and a color developer, and further contains other components as needed.

The leuco dye is not particularly limited, and it can be selected as appropriate depending on the purpose from those normally used for thermosensitive recording material. However, leuco compounds of dyes of a triphenylmethane system, a fluoran system, a phenothiazine system, an auramine system, a spiropyran system, an indolinophthalide system, and the like are preferably used, for example.

As for the color developer, various electron-accepting compounds, oxidizing agents, or the like that cause the leuco dyes to develop color upon contact can be applied.

Examples of the other components include a binder resin, a photothermal conversion material, a heat-fusible substance, an antioxidant, a light stabilizer, a surfactant, a lubricant, a filler, and the like.

Supporting Member

As for the supporting member, the shape, structure, size, and the like of the member are not particularly limited, and they can be selected as appropriate depending on the purpose. Examples of the shape include a flat-plate shape and the like. The structure may be in a single layer structure or a layered structure. The size can be selected as appropriate depending on the size and the like of the thermosensitive recording medium.

Other Layers

Examples of the other layers include a photothermal conversion layer, a protective layer, an under layer, an ultraviolet absorbing layer, an oxygen blocking layer, an intermediate layer, a back layer, an adhesive layer, a pressure-sensitive adhesive layer, and the like.

The thermosensitive recording medium can be processed into a desired shape according to its use. Examples of the shape include a card shape, a tag shape, a label shape, a sheet shape, a roll shape, and the like. Examples of the card shaped workpiece include a prepaid card, a point card, a credit card, and the like. The workpieces processed into a tag shape in a size smaller than the card size can be used for price tags and the like. Furthermore, the workpieces processed into a tag shape in a size larger than the card size can be used for process management, shipping instructions, tickets, and the like. Because the workpieces processed into a label shape can be pasted up, the workpieces are processed in various sizes and can be used for process management, article management, and the like by pasting up the labels to a dolly, a container, a box, a container, and the like that are used repeatedly. The workpieces processed in a sheet size larger than the card size can be used for general documents, instruction documents for process management, and the like, because the range of recording images is widened.

Examples of the thermosensitive recording portion that the structure has include a region where the thermosensitive recording medium in a label shape is pasted up to the surface of the structure, a region where a thermosensitive recording material is applied on the surface of the structure, and the like. Furthermore, the structure having the thermosensitive recording portion is not particularly limited as long as it has the thermosensitive recording portion on the surface of the structure, and it can be selected as appropriate depending on the purpose. Examples of the structure having the thermosensitive recording portion include various goods such as plastic bags, PET bottles, cans, and the like, shipping containers such as cardboard boxes, containers, and the like, works-in-process, industrial products, and the like.

The following describes, as one example, an image recording apparatus that records an image on a structure having a thermosensitive recording portion as a recording object, specifically, a transport container on which a thermosensitive recording label is pasted up.

FIG. 1 is a schematic perspective view of an image recording system 100 that is an image recording apparatus according to the embodiment. In the following description, the conveying direction of a container C for transportation is described as an X-axis direction, the up-and-down direction is described as a Z-axis direction, and the direction orthogonal to both the conveying direction and the up-and-down direction is described as a Y-axis direction.

The image recording system 100 records, as described in detail below, an image by irradiating with a laser beam a thermosensitive recording label RL pasted up on the transport container C that is a recording object.

The image recording system 100 includes, as illustrated in FIG. 1, a conveyor device 10 that is a recording-object conveying unit, a recording device 14, a system control device 18, a reading device 15, a shielding cover 11, and others.

The recording device 14 irradiates the thermosensitive recording label RL with a laser beam, and records on the recording object an image that is a visible image. The recording device 14 is arranged on the −Y side of the conveyor device 10, that is, on the −Y side of the conveying path.

The shielding cover 11 shields the laser beam emitted from the recording device 14 so as to reduce the diffusion of the laser beam, and the surface thereof is painted with a black alumite coating. In a portion of the shielding cover 11 facing the recording device 14, an opening 11a for letting the laser beam pass through is provided. In the present embodiment, the conveyor device 10 is a roller conveyor, but may be a belt conveyor.

The system control device 18 is coupled to the conveyor device 10, the recording device 14, the reading device 15, and others, and controls the entire image recording system 100. The reading device 15, as will be described later, reads a code image such as a barcode and a QR code recorded on the recording object. The system control device 18 checks, based on the information read by the reading device 15, whether the image is correctly recorded.

Now, the thermosensitive recording label RL pasted up on the container C will be described.

The thermosensitive recording label RL is a thermosensitive recording medium and recording of an image is made by changing the color tone by heat. In the present embodiment, a thermosensitive recording medium that performs single image recording is used as the thermosensitive recording label RL. However, a thermo-reversible recording medium capable of a plurality of recordings can also be used as the thermosensitive recording label RL.

As the thermosensitive recording medium used as the thermosensitive recording label RL used in the present embodiment, used was a thermosensitive recording medium that includes a material that absorbs a laser beam and converts it into heat (photothermal conversion material) and a material that causes changes in hue, reflectivity, and others by heat.

The photothermal conversion material can be broadly divided into an inorganic material and an organic material. Examples of the inorganic material include particles of at least one of carbon black, metal boride, and metal oxide such as Ge, Bi, In, Te, Se, Cr, and others. As for the inorganic material, a material for which the absorption of light in a near infrared wavelength region is large and for which the absorption of light in a visible-range wavelength region is small is preferable, and the metal boride and the metal oxide are preferable. As for the inorganic material, at least one kind selected from hexaboride, tungsten oxide compound, antimony tin oxide (ATO), indium tin oxide (ITO), and zinc antimonate is suitable, for example.

Examples of the hexaboride include $LaB_6$, $CeB_6$, $PrB_6$, $NdB_6$, $GdB_6$, $TbB_6$, $DyB_6$, $HoB_6$, $YB_6$, $SmB_6$, $EuB_6$, $ErB_6$, $TmB_6$, $YbB_6$, $LuB_6$, $SrB_6$, $CaB_6$, $(La, Ce)B_6$, and the like.

Examples of the tungsten oxide compound include, as described in WO2005/037932, Japanese Patent Application Laid-open No. 2005-187323, and others, fine particles of tungsten oxide expressed by the general formula $WyOz$ (where W is tungsten, O is oxygen, $2.2 \leq z/y \leq 2.999$), fine particles of composite tungsten oxide expressed by the general formula $MxWyOz$ (where M is one or more types of elements selected from H, He, alkali metal, alkaline-earth metal, rare earth elements, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, OS, Bi, and I, W is tungsten, O is oxygen, $0.001 \leq x/y \leq 1$, $2.2 \leq z/y \leq 3.0$), and others.

Among those, as the tungsten oxide compound, cesium-containing tungsten oxide is particularly preferable in that the absorption in the near-infrared region is large and the absorption in the visible region is small.

Furthermore, as the tungsten oxide compound, among the antimony tin oxide (ATO), the indium tin oxide (ITO), and the zinc antimonate, ITO is particularly preferable in that the absorption in the near-infrared region is large and the absorption in the visible region is small. These are formed in a layer by vacuum vapor deposition or by bonding particulate materials with resin and the like.

As the organic material, various dyes can be used as appropriate according to the wavelength of light to absorb. However, when a semiconductor laser is used as a light source, a near-infrared absorption dye having an absorption peak near 600 to 1200 nm is used. Specifically, examples of the organic material include cyanine dyes, quinone dyes, quinoline derivatives of indonaphthol, phenylenediamine-nickel complexes, phthalocyanine dyes, and the like.

As for the photothermal conversion material, a single kind may be used alone, or two or more kinds may be used in combination. The photothermal conversion material may be provided in an image recording layer or may be provided in a portion other than the image recording layer. When the photothermal conversion material is used in a portion other than the image recording layer, it is preferable that a photothermal conversion layer be provided adjacent to the thermo-reversible recording layer.

The photothermal conversion layer contains at least the photothermal conversion material and a binder resin.

As the material that causes changes in hue, reflectivity, and others by heat, known materials used in conventional thermosensitive paper such as a combination of an electron-donating dye precursor and an electron-accepting color developing agent, or the like can be used, for example. Furthermore, as the material that causes changes in hue, reflectivity, and others by heat, materials that cause changes in a composite reaction of heat and light, such as discoloration reaction accompanying solid-phase polymerization due to heating and ultraviolet light irradiation of a diacetylenic compound, are also included, for example.

Figure 2:
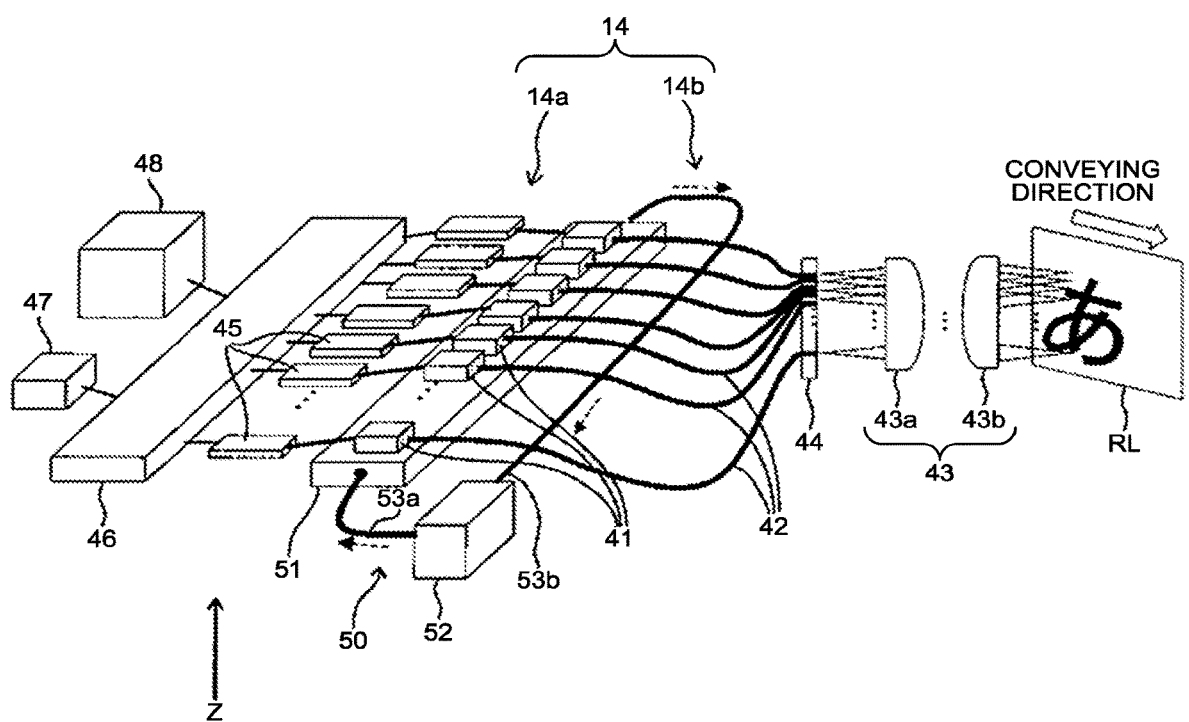
FIG. 2 is a schematic perspective view illustrating a configuration of a recording device.

FIG. 2 is a schematic perspective view illustrating the configuration of the recording device 14.

In the present embodiment, as the recording device 14, used is a fiber-array recording apparatus that records an image by using a fiber array in which laser emitting portions of a plurality of optical fibers are arranged in an array form in a main-scanning direction (Z-axis direction) orthogonal to a sub-scanning direction (X-axis direction) which is a moving direction of the container C that is the recording object. The fiber-array recording apparatus irradiates the recording object with laser beams emitted from laser light-emitting elements via the fiber array, and records an image composed of units of drawing. Specifically, the recording device 14 includes a laser array unit 14a, a fiber array unit 14b, and an optical unit 43. The laser array unit 14a is provided with a plurality of laser light-emitting elements 41 arranged in an array form, a cooling unit 50 that cools the laser light-emitting elements 41, a plurality of drivers 45 provided corresponding to the laser light-emitting elements 41 for driving the corresponding laser light-emitting elements 41, and a controller 46 that controls the drivers 45. The controller 46 is coupled to a power source 48 for supplying electric power to the laser light-emitting elements 41, and an image-information output unit 47 such as a personal computer that outputs image information.

The laser light-emitting element 41 can be selected as appropriate depending on the purpose, and a semiconductor laser, a solid laser, a dye laser, or the like can be used, for example. Among these, as the laser light-emitting element 41, a semiconductor laser is preferable in that the selectivity in wavelength is wide, in that being small allows downsizing of the device, and in that the cost reduction is possible.

The wavelength of the laser beam that the laser light-emitting element 41 emits is not particularly limited, and it can be selected as appropriate depending on the purpose. However, it is preferably 700 nm to 2000 nm and is more preferably 780 nm to 1600 nm.

In the laser light-emitting element 41 that is an emitting means, not all the energy applied thereto is converted into a laser beam. Normally, in the laser light-emitting element 41, the energy not converted into the laser beam is converted into heat, thereby generating heat. Thus, the laser light-emitting elements 41 are cooled by the cooling unit 50 that is a cooling means. In the present embodiment, the recording device 14 uses the fiber array unit 14b, thereby making it possible to arrange the respective laser light-emitting elements 41 apart from one another. Accordingly, because it is possible to reduce the influence of the heat from the adjacent laser light-emitting elements 41 and efficiently cool the laser light-emitting elements 41, it is possible to avoid the rise in and the variations of temperature of the laser light-emitting elements 41, to reduce the variations of the output of laser beam, and to improve density unevenness and white spots. The output of laser beam is an average output measured with a power meter. There are two types of laser-beam output control methods, and there are a method of controlling a peak power, and a method of controlling a light emission ratio (duty:laser emission time/periodic time) of the pulse.

The cooling unit 50 is of a liquid-cooling system that cools the laser light-emitting elements 41 by circulating a coolant, and includes a heat receiving unit 51 in which the coolant receives heat from the respective laser light-emitting elements 41 and a heat dissipation unit 52 that dissipates the heat of the coolant. The heat receiving unit 51 and the heat dissipation unit 52 are connected by cooling pipes 53a and 53b. The heat receiving unit 51 is provided with a cooling pipe through which the coolant formed of a good heat conducting member flows in a case that is formed of a good heat conducting member. The laser light-emitting elements 41 are arranged in an array form on the heat receiving unit 51.

The heat dissipation unit 52 includes a radiator, and a pump for circulating the coolant. The coolant sent out by the pump of the heat dissipation unit 52 passes through the cooling pipe 53a and flows into the heat receiving unit 51. Then, while moving through the cooling pipe in the heat receiving unit 51, the coolant takes away the heat of the laser light-emitting elements 41 arrayed on the heat receiving unit 51 and cools the laser light-emitting elements 41. The coolant that has risen in temperature by taking away the heat of the laser light-emitting elements 41 and flowed out from the heat receiving unit 51 moves in the cooling pipe 53b, flows into the radiator of the heat dissipation unit 52, and is cooled by the radiator. The coolant cooled by the radiator is sent out to the heat receiving unit 51 by the pump again.

The fiber array unit 14b includes a plurality of optical fibers 42 that are provided corresponding to the laser light-emitting elements 41, and an array head 44 that holds the vicinities of laser emitting portions 42a of the optical fibers 42 (see FIG. 3B) in an array form in the up-and-down direction (Z-axis direction). A laser incidence portion of each optical fiber 42 is attached to a laser emitting surface of the laser light-emitting element 41 corresponding thereto.

Figure 3A:
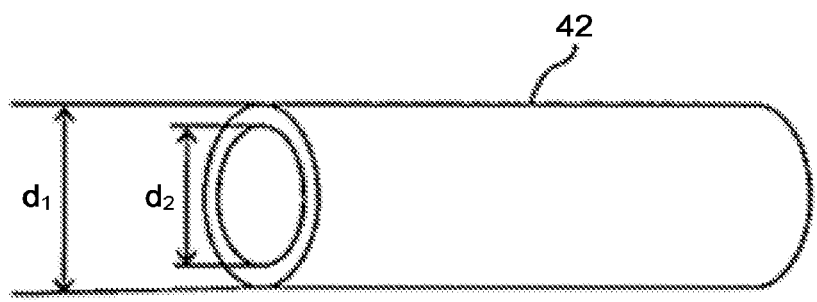
FIG. 3A is an enlarged schematic diagram of an optical fiber.
Figure 3B:
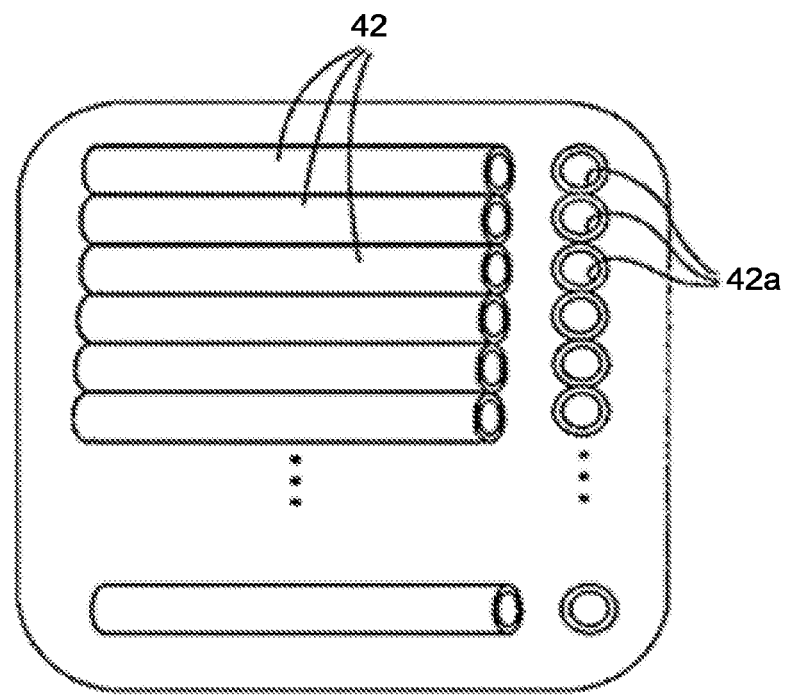
FIG. 3B is an enlarged view of the vicinity of an array head.

FIG. 3A is an enlarged schematic diagram of the optical fiber 42, and FIG. 3B is an enlarged view of the vicinity of the array head 44.

The optical fiber 42 is an optical waveguide of the laser beam emitted from the laser light-emitting element 41. The shape, size (diameter), material, structure, and the like of the optical fiber 42 are not particularly limited, and they can be selected as appropriate depending on the purpose.

As for the size (diameter d1) of the optical fiber 42, it is preferably equal to or more than 15 μm but equal to or less than 1000 μm. When the diameter d1 of the optical fiber 42 is equal to or more than 15 μm but equal to or less than 1000 μm, it is advantageous in terms of image definition. In the present embodiment, as the optical fiber 42, an optical fiber having a diameter of 125 μm was used.

The material of the optical fiber 42 is not particularly limited, and it can be selected as appropriate depending on the purpose, and examples thereof include glass, resin, quartz, and the like.

As for the structure of the optical fiber 42, preferable is a structure that is made up of a core portion in a central portion through which the laser beam passes, and a cladding layer provided on the outer circumference of the core portion.

A diameter d2 of the core portion is not particularly limited, and it can be selected as appropriate depending on the purpose. However, it is preferably equal to or more than 10 μm but equal to or less than 500 μm. In the present embodiment, the optical fiber with the core portion having the diameter d2 of 105 μm was used. The material of the core portion is not particularly limited, and it can be selected as appropriate depending on the purpose, and examples thereof include glass and the like doped with germanium and phosphorus.

As for an average thickness of the cladding layer, although it is not particularly limited, and can be selected as appropriate depending on the purpose, it is preferably equal to or more than 10 μm but equal to or less than 250 μm. The material of the cladding layer is not particularly limited, and it can be selected as appropriate depending on the purpose. Examples of the cladding layer include glass doped with boron or fluorine.

As illustrated in FIG. 3B, the vicinities of the laser emitting portions 42a of the optical fibers 42 are held in an array form by the array head 44 such that the pitch of the laser emitting portions 42a of the respective optical fibers 42 is 127 μm. In the recording device 14, in order to make it possible to record an image having a resolution of 200 dpi, the pitch of the laser emitting portions 42a is set to 127 μm.

When attempting to hold all the optical fibers 42 with a single array head 44, the array head 44 becomes long and is likely to be deformed. As a result, with a single array head 44, it is difficult to hold the linearity of the beam array and the uniformity of the beam pitch. Thus, the array head 44 is assumed to hold 100 to 200 optical fibers 42. Moreover, in the recording device 14, it is preferable that a plurality of array heads 44 holding 100 to 200 optical fibers 42 be arranged side-by-side in the Z-axis direction that is a direction orthogonal to the conveying direction of the container C. In the present embodiment, 200 array heads 44 were arranged side-by-side in the Z-axis direction.

FIGS. 4A to 4E are diagrams illustrating examples of the arrangement of the array heads 44.

Figure 4A:
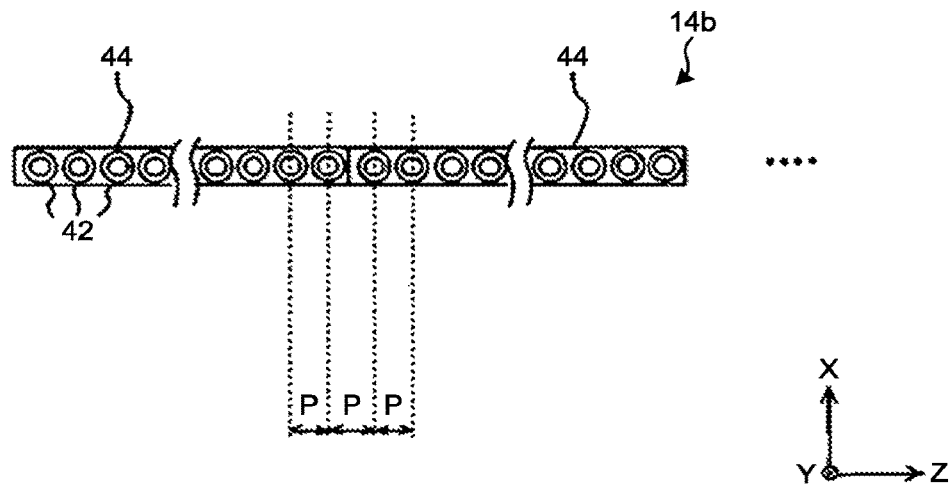
FIG. 4A is a diagram illustrating one example of arrangement of the array heads.
Figure 4B:
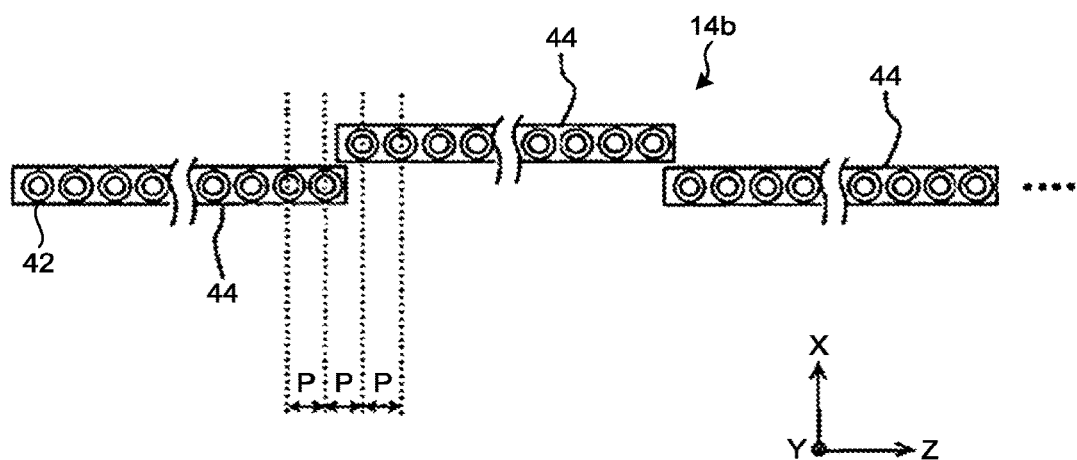
FIG. 4B is a diagram illustrating one example of the arrangement of the array heads.

FIG. 4A is an example in which the array heads 44 of the fiber array unit 14b in the recording device 14 are arranged in an array form in the Z-axis direction. FIG. 4B is an example in which the array heads 44 of the fiber array unit 14b in the recording device 14 are arranged in a zigzag pattern.

In the arrangement of the array heads 44, it is preferable to be arranged in a zigzag pattern as illustrated in FIG. 4B, rather than being linearly arranged in the Z-axis direction as illustrated in FIG. 4A, in terms of ease of assembly.

Figure 4C:
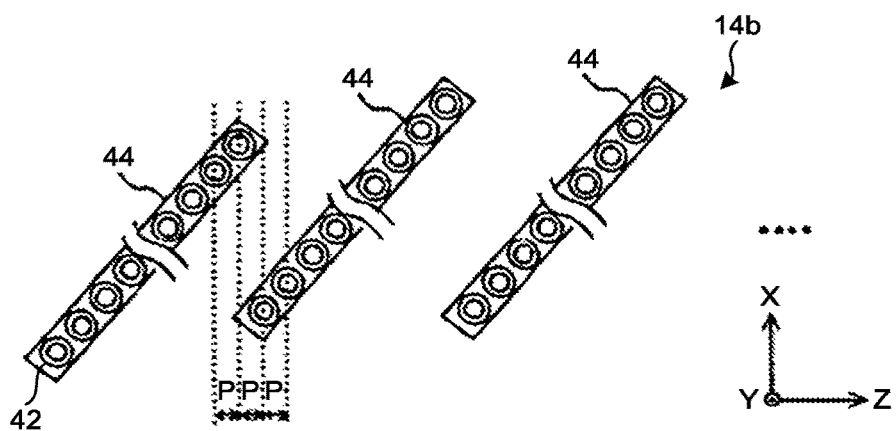
FIG. 4C is a diagram illustrating one example of the arrangement of the array heads.

FIG. 4C is an example in which the array heads 44 of the fiber array unit 14b in the recording device 14 are arranged being tilted in the X-axis direction. By arranging the array heads 44 as illustrated in FIG. 4C, a pitch P in the Z-axis direction of the optical fibers 42 can be made narrower than that of the arrangement illustrated in FIGS. 4A and 4B, and high resolution can be achieved.

Figure 4D:
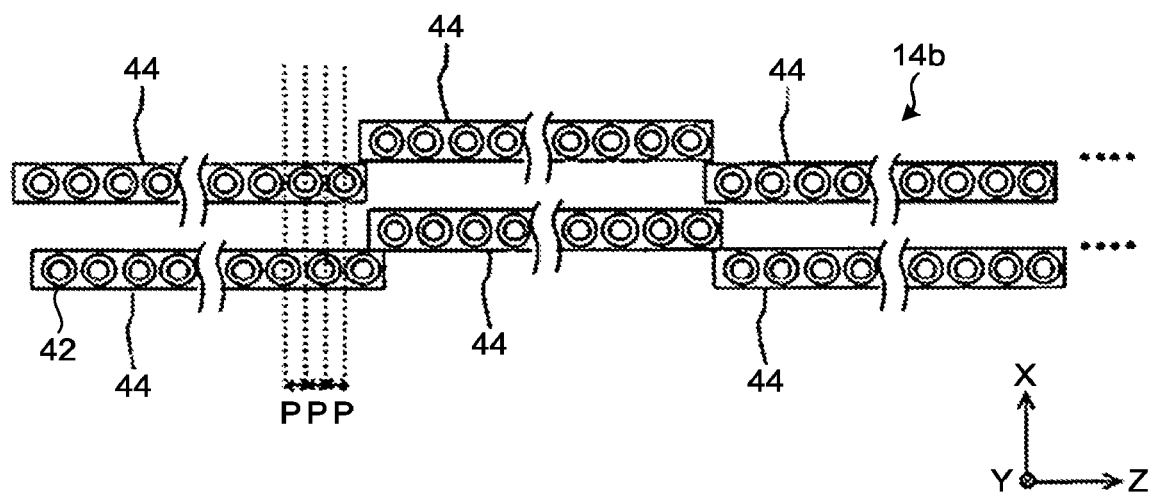
FIG. 4D is a diagram illustrating one example of the arrangement of the array heads.

FIG. 4D is an example in which two array head groups, in which the array heads 44 of the fiber array unit 14b in the recording device 14 are arranged in a zigzag pattern, are arranged in the sub-scanning direction (X-axis direction), and in which one of the array head groups is shifted in the main-scanning direction (Z-axis direction) by one-half of array pitch of the optical fibers 42 of the array head 44 with respect to the other of the array head groups. By also arranging the array heads 44 as illustrated in FIG. 4D, the pitch P in the Z-axis direction of the optical fibers 42 can be made narrower than those of the arrangements illustrated in FIGS. 4A and 4B, and the high resolution can be achieved.

Meanwhile, in accordance with the control of the system control device 18, the recording device 14 of the present embodiment transmits and records image information in a direction orthogonal to the scanning direction of the thermosensitive recording label RL pasted up on the transport container C that is the recording object. Thus, when there is a difference between the scanning of the thermosensitive recording label RL and the transmission timing of the image information in the orthogonal direction, the recording device 14 stores the image information in a memory, thereby increasing the amount of image storage. In such a case, the example of the arrangement of the array heads 44 illustrated in FIG. 4D can make the amount of information storage for the memory of the system control device 18 lower than that of the example of the arrangement of the array heads 44 illustrated in FIG. 4C.

Figure 4E:
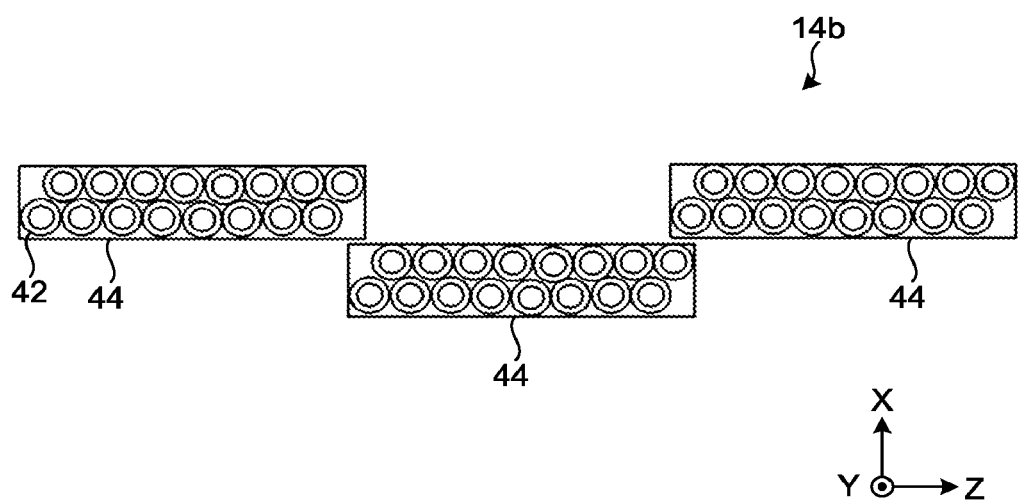
FIG. 4E is a diagram illustrating one example of the arrangement of the array heads.

Moreover, FIG. 4E is an example in which the two array head groups in which the array heads 44 are arranged in a zigzag pattern illustrated in FIG. 4D are stacked as a single array head group. Such array heads 44 for which two array head groups are stacked as a single array head group can be easily fabricated in manufacturing, and the high resolution can be achieved. In addition, the example of the arrangement of the array heads 44 illustrated in FIG. 4E can make the amount of information storage for the memory of the system control device 18 lower than that of the example of the arrangement of the array heads 44 illustrated in FIG. 4D.

As illustrated in the previous FIG. 2, the optical unit 43 includes a collimator lens 43a that converts a laser beam of divergent luminous flux emitted from each optical fiber 42 into a parallel light flux, and a condenser lens 43b that focuses the laser beam onto the surface of the thermosensitive recording label RL that is the laser irradiation surface. Whether to provide the optical unit 43 is only needed to be selected depending on the purpose.

The image-information output unit 47 such as a personal computer inputs image data to the controller 46. The controller 46 generates, based on the input image data, drive signals to drive the respective drivers 45. The controller 46 transmits the generated drive signals to the respective drivers 45. Specifically, the controller 46 includes a clock generator. When the number of clocks that the clock generator oscillates reaches a prescribed number of clocks, the controller 46 transmits to the respective drivers 45 the drive signals for driving the respective drivers 45.

Each of the drivers 45 drives, upon receiving the drive signal, the laser light-emitting element 41 corresponding thereto. The laser light-emitting element 41 emits a laser in accordance with the drive of the driver 45. The laser beam emitted from the laser light-emitting element 41 enters the corresponding optical fiber 42 and is emitted from the laser emitting portion 42a of the optical fiber 42. The laser beam emitted from the laser emitting portion 42a of the optical fiber 42 irradiates, after transmitting through the collimator lens 43a and the condenser lens 43b of the optical unit 43, the surface of the thermosensitive recording label RL of the container C that is the recording object. The surface of the thermosensitive recording label RL is heated by being irradiated by the laser beam, thereby recording an image on the surface of the thermosensitive recording label RL.

When a device that records an image on a recording object by deflecting a laser using a galvanometer mirror as a recording device is used, the image such as characters is recorded by emitting the laser beam so as to draw it by a stroke by the rotation of the galvanometer mirror. Because of this, when recording a certain amount of information on the recording object, there is a problem in that the recording is not made in time unless stopping the conveyance of the recording object. Meanwhile, by using a laser array in which a plurality of laser light-emitting elements 41 are arranged in an array form as in the recording device 14 of the present embodiment, it is possible to record an image on the recording object by on/off control of the laser light-emitting elements 41 corresponding to the respective pixels. Accordingly, even when the amount of information is large, it is possible to record an image on the recording object without stopping the conveyance of the container C. Thus, according to the recording device 14 of the present embodiment, even when a large amount of information is recorded on the recording object, it is possible to record the image without deteriorating the productivity.

As will be described later, because an image is recorded on the recording object by irradiating the recording object with a laser beam and heating it, the recording device 14 of the present embodiment needs to use the laser light-emitting elements 41 of a high output to some extent. Thus, the amount of heat generated by the laser light-emitting elements 41 is large. In a conventional laser array recording apparatus not having the fiber array unit 14b, it needs to arrange the laser light-emitting elements 41 in an array form at the intervals corresponding to the resolution. Accordingly, in the conventional laser array recording apparatus, in order to obtain a resolution of 200 dpi, the laser light-emitting elements 41 are arranged at a very narrow pitch. As a result, in the conventional laser array recording apparatus, the heat of the laser light-emitting elements 41 is difficult to escape and the laser light-emitting elements 41 become high in temperature. In the conventional laser array recording apparatus, when the laser light-emitting elements 41 become high in temperature, the wavelength and optical output of the laser light-emitting elements 41 fluctuate, and it is no longer possible to heat the recording object to a prescribed temperature and is not possible to obtain a satisfactory image. In addition, in the conventional laser array recording apparatus, in order to suppress such a rise in temperature of the laser light-emitting elements 41, it needs to reduce the conveying speed of the recording object and to allow the emission interval of the laser light-emitting elements 41, and it is not possible to increase the productivity sufficiently.

Normally, a cooling unit often uses a chiller system and, in the system, only cooling is performed without performing heating. Thus, although the temperature of the light source never gets higher than the set temperature of the chiller, the temperature of the cooling unit 50 and that of the laser light-emitting elements 41 that are the laser light source in contact fluctuate by the environment temperature. Meanwhile, when a semiconductor laser is used as the laser light-emitting element 41, a phenomenon in which the laser output fluctuates depending on the temperature of the laser light-emitting element 41 occurs (the laser output increases as the temperature of the laser light-emitting element 41 becomes lower). In order to control the laser output, it is preferable that normal image forming be performed, by measuring the temperature of the laser light-emitting elements 41 or the temperature of the cooling unit 50 and, in response to the measurement result, by controlling the input signals to the drivers 45 that control the laser output such that the laser output is constant.

Meanwhile, the recording device 14 of the present embodiment is a fiber-array recording apparatus using the fiber array unit 14b. By using the fiber-array recording apparatus, the laser emitting portions 42a of the fiber array unit 14b only need to be arranged corresponding to the resolution, and there is no need to make the pitch between the laser light-emitting elements 41 of the laser array unit 14a be the pitch corresponding to the image resolution. Thus, according to the recording device 14 of the present embodiment, the pitch between the laser light-emitting elements 41 can be adequately widened such that the heat of the laser light-emitting elements 41 can be sufficiently dissipated. Thus, according to the recording device 14 of the present embodiment, it is possible to restrain the laser light-emitting elements 41 from getting high in temperature and is possible to restrain the wavelength and optical output of the laser light-emitting element 41 from fluctuating. As a result, according to the recording device 14 of the present embodiment, it is possible to record a satisfactory image on the recording object. In addition, even when the interval of light emission of the laser light-emitting element 41 is shortened, it is possible to suppress the rise in temperature of the laser light-emitting elements 41, is possible to increase the conveying speed of the container C, and is possible to enhance the productivity.

In the recording device 14 of the present embodiment, by providing the cooling unit 50 and by liquid-cooling the laser light-emitting elements 41, it is possible to further suppress the rise in temperature of the laser light-emitting elements 41. As a result, according to the recording device 14 of the present embodiment, it is further possible to shorten the interval of light emission of the laser light-emitting element 41, to increase the conveying speed of the container C, and to enhance the productivity. In the recording device 14 of the present embodiment, the laser light-emitting elements 41 are liquid-cooled. However, the laser light-emitting elements 41 may be air-cooled by using a cooling fan. The liquid-cooling has a higher cooling efficiency, and there is a merit of being able to cool the laser light-emitting elements 41 satisfactorily. Meanwhile, by providing the air-cooling, the cooling efficiency is reduced, but there is a merit of being able to cool the laser light-emitting elements 41 at low cost.

Figure 5:
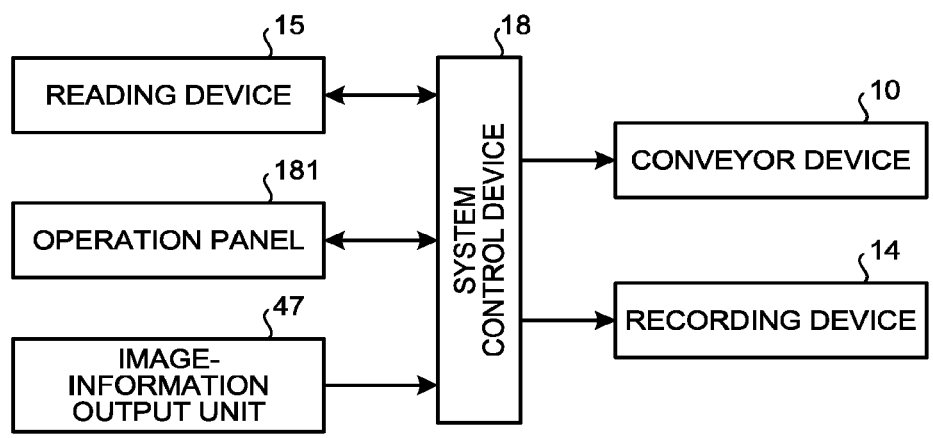
FIG. 5 is a block diagram illustrating a part of an electric circuit in the image recording system.

FIG. 5 is a block diagram illustrating a part of an electric circuit in the image recording system 100. In FIG. 5, the system control device 18 includes a CPU, a RAM, a ROM, a non-volatile memory, and others, controls the driving of various devices in the image recording system 100, and performs various arithmetic processes. The system control device 18 is connected to the conveyor device 10, the recording device 14, the reading device 15, an operation panel 181, the image-information output unit 47, and others.

The operation panel 181 includes a touch panel display and various kinds of keys, and it displays images and receives a variety of information that is input by key operation of an operator.

As illustrated in FIG. 5, the system control device 18 functions, as the CPU operates in accordance with a program stored in the ROM or the like, as an image recording unit. The system control device 18 that functions as the image recording unit controls the recording device 14 that is a laser emitting device so as to irradiate with laser via the optical fiber array a recording object that relatively moves to a direction different from the predetermined direction with respect to the laser emitting device, thereby heating the recording object and recording an image.

Next, an example of the operation of the image recording system 100 will be described with reference to FIG. 1. First, the container C in which a package is accommodated is placed on the conveyor device 10 by an operator. The operator places the container C on the conveyor device 10 so that the side surface of the body of the container C on which the thermosensitive recording label RL is pasted up is positioned on the −Y side, that is, the side surface faces the recording device 14.

When the operator operates the operation panel 181 to start the system control device 18, a conveyance start signal is transmitted from the operation panel 181 to the system control device 18. The system control device 18 that received the conveyance start signal starts the driving of the conveyor device 10. Consequently, the container C placed on the conveyor device 10 is conveyed toward the recording device 14 by the conveyor device 10. An example of the conveying speed of the container C is 2 m/sec.

On the upstream side of the recording device 14 in the conveying direction of the container C, arranged is a sensor that detects the container C that is conveyed on the conveyor device 10. When the sensor detects the container C, a detection signal is transmitted from the sensor to the system control device 18. The system control device 18 includes a timer. The system control device 18 starts time measurement using the timer, at the timing of receiving the detection signal from the sensor. Then, the system control device 18 understands, based on the elapsed time from the reception timing of the detection signal, the timing at which the container C reaches the recording device 14.

At the timing at which the elapsed time from the reception timing of the detection signal becomes Tl and at which the container C reaches the recording device 14, the system control device 18 outputs a recording start signal to the recording device 14 in order to record an image on the thermosensitive recording label RL which is pasted up on the container C that passes through the recording device 14.

The recording device 14 that received the recording start signal emits, based on the image information received from the image-information output unit 47, the laser beam of a predetermined power towards the thermosensitive recording label RL of the container C that relatively moves with respect to the recording device 14. Accordingly, the image is recorded on the thermosensitive recording label RL in a non-contact manner.

Examples of the image recorded on the thermosensitive recording label RL (image information transmitted from the image-information output unit 47) include a character image such as information on the content and destination of the package accommodated in the container C, and a code image such as a barcode and a two-dimensional code (such as QR code) for which information such as information on the content and destination of the package accommodated in the container C is coded.

The container C on which the image was recorded in the process of passing through the recording device 14 passes through the reading device 15. At this time, the reading device 15 reads the code image such as a barcode and a two-dimensional code recorded on the thermosensitive recording label RL, and acquires information such as the content and destination of the package accommodated in the container C. The system control device 18 collates the information acquired from the code image with the image information transmitted from the image-information output unit 47 and checks whether the image is correctly recorded. When the image is correctly recorded, the system control device 18 sends the container C to a subsequent process (for example, transportation preparation process) by the conveyor device 10.

Meanwhile, when the image is not correctly recorded, the system control device 18 stops the conveyor device 10 temporarily and, on the operation panel 181, displays an effect that the image was not correctly recorded. When the image is not correctly recorded, the system control device 18 may further convey the relevant container C to a prescribed conveying destination.

Incidentally, when the recording processing is performed by the recording device 14 on the container C that is vibrating in conveying by the conveyor device 10, the vibration may affect the quality of image recorded on the thermosensitive recording label RL.

For example, due to the vibration of the container C, the character image recorded on the thermosensitive recording label RL may be distorted, this may not only impair the aesthetic appearance of the characters but also make the reading of the information by a person difficult, and a practical problem is likely to arise. With the two-dimensional code such as a QR code also, the image may be collapsed due to the vibration and that may make the reading of the information difficult.

Thus, in the present embodiment, it is configured so as to suppress the vibration of the conveyor device 10. As illustrated in verification experiments which will be described later, in the image recording system 100 that does not record a two-dimensional code such as a QR code on the container C that is the recording object, the amplitude of vibration of the conveyor device 10 is made to be 6 mm or less. In the image recording system 100 that records a two-dimensional code such as a QR code having a line width of 0.375 mm on the container C that is the recording object, by a vibration isolation device, the amplitude of vibration of the conveyor device 10 is made to be 2 mm or less. In the image recording system 100 that records a two-dimensional code such as a QR code having a line width of 0.5 mm on the container C that is the recording object, the amplitude of vibration of the conveyor device 10 is made to be 3 mm or less. By making the amplitude of vibration of the conveyor device 10 be 2 mm or less, it is possible to record both the two-dimensional code and the character image with good quality on the recording object. Examples of the suppression of the vibration of the conveyor device 10 include providing a vibration isolation device on the conveyor device 10.

In the image recording system 100 that records a barcode on the recording object, the image information according to which bars of the barcode are to be recorded on the thermosensitive recording label RL in the direction orthogonal to the conveying direction of the container C that is the recording object is transmitted from the image-information output unit 47. Accordingly, in the image recording system 100 that records a barcode on the container C that is the recording object, even when the vibration occurs on the container C in conveying by the conveyor device 10, it is possible to reduce the influence of the vibration on the quality of the image recorded on the thermosensitive recording label RL.

Furthermore, if the recording device 14 and the conveyor device 10 simultaneously vibrate, no influence of the vibration is exerted on the image recorded on the thermosensitive recording label RL of the container C that is the recording object. Accordingly, the recording device 14 may be mounted on the conveyor device 10, or the resonant frequency of the recording device 14 and that of the conveyor device 10 may be made to match. When the conveyor device 10 is a roller conveyor, it is likely to vibrate due to the vertical movement of each roller and the influence for which each roller is not a perfect circle. Thus, by changing the conveyor device 10 to a belt conveyor, the vibration can be suppressed.

If the recording object is lightweight or has a large volume, it may be moved when recording an image on the thermosensitive recording label RL due to the influence of airflow. Accordingly, the image recording system 100 may be provided with a flow straightening (windbreak) device.

If the period of vibration of the container C is sufficiently long with respect to the time for recording an image on the thermosensitive recording label RL, even when the amplitude of vibration of the container C is somewhat large, the amount of movement of the container C in the up-and-down direction (Z-axis direction) at the time of recording the image is small, and the influence on the quality of the image is reduced. Accordingly, when the amplitude of vibration of the container C cannot be suppressed sufficiently, the conveyor device 10 may be designed such that the natural frequency of the conveyor device 10 is to be a low frequency, for example.

Furthermore, when recording an image on the thermosensitive recording label RL of the container C that is the recording object, sudden vibration may occur as an object collides with the conveyor device 10. In this case, the container C may vibrate greatly, and a high-quality image may be not recorded on the recording object. Accordingly, the image recording system 100 may be provided with a vibration detection sensor on the conveyor device 10, and it may be configured to stop the conveyor device 10 when the vibration detection sensor detects that the vibration of the conveyor device 10 exceeded a prescribed level.

Next, verification experiments performed by the present applicants will be described.

First Verification Experiment

In a first verification experiment, the container C was conveyed at a conveying speed of 3 m/sec while applying vibration to the conveyor device 10 in the Z-axis direction, and the characters of "rose (in Chinese characters)" in Ming-style typeface at 6 pt were recorded on the thermosensitive recording label RL of the container C that is the recording object. Furthermore, the maximum value of the magnitude of vibration during recording was measured by using a laser displacement gauge (LK-H085 manufactured by Keyence Corporation, measurement distance range 85±18 mm). In Example 1, the maximum value of the amplitude is 3 mm, in Example 2, the maximum value of the amplitude is 6 mm, and in Comparative Example 1, the maximum value of the amplitude is 9 mm. The laser displacement gauge measured the vibration of the surface of the container C from the Z-axis direction. Then, the characters recorded on the recording object were observed both visually and with a scale magnifier (10× scale magnifier manufactured by PEAK). When the characters are easy to read visually, it was rated as "⊚", when the characters can be read with the scale magnifier, it was rated as "○", and when the characters are difficult to read, it was rated as "x". The result thereof is illustrated in Table 1.

TABLE 1

| | Max. Value Of Amplitude (mm) | Legibility Of Characters |
|---|---|---|
| Example 1 | 3 | ⊚ |
| Example 2 | 6 | ○ |
| Comparative Example 1 | 9 | X |

From the above, an amplitude measurement device that measures the amplitude of vibration may be provided on the conveyor device 10, and it may be configured to stop the conveyor device 10 temporarily when the amplitude of vibration measured by the amplitude measurement device exceeds 6 mm. As the amplitude measurement device, the laser displacement gauge (LK-H085 manufactured by Keyence Corporation, measurement distance range 85±18 mm) used in the first verification experiment can be used. The laser displacement gauge measures the vibration of the surface of the container C from the Z-axis direction, thereby measuring the amplitude of vibration occurring on the conveyor device 10. The threshold of the amplitude to temporarily stop the conveyor device 10 is not limited to 6 mm, and only needs to be determined as appropriate depending on the configuration of the conveyor device 10. When the amplitude of vibration of the conveyor device 10 exceeded the threshold at the time of recording an image on the thermosensitive recording label RL by the recording device 14, the conveyor device 10 may convey the container C, which is the recording object, to a prescribed conveying destination.

Furthermore, the amplitude of the conveyor device 10 may be designed to be 6 mm or less. Accordingly, it is possible to record an image while the amplitude of vibration of the container C that is the recording object is 6 mm or less, and it is possible to record characters with high quality.

Second Verification Experiment

In a second verification experiment, a QR code having a line width of 0.375 mm was recorded on the thermosensitive recording label RL of the container C that is the recording object at the conveying speed of 1 m/sec of the conveyor device 10, and the printing evaluation of the recorded QR code was carried out. Other than this, others are the same as those of the first verification experiment. In Example 3, the maximum value of the amplitude is 1 mm, in Example 4, the maximum value of the amplitude is 2 mm, in Comparative Example 2, the maximum value of the amplitude is 4 mm, and in Comparative Example 3, the maximum value of the amplitude is 6 mm. The printing evaluation on the QR code is standardized in ISO 15415. Overall grade C or higher was rated as "⊚", overall grade D was rated as "○", and overall grade F was rated as "x". The result thereof is illustrated in Table 2.

TABLE 2

|  | Max. Value Of Amplitude (mm) | QR Code Readability |
|---|---|---|
| Example 3 | 1 | ⊚ |
| Example 4 | 2 | ○ |
| Comparative Example 2 | 4 | X |
| Comparative Example 3 | 6 | X |

Third Verification Experiment

In a third verification experiment, the line width of the QR code was set to a line width of 0.5 mm. Other than this, the third verification experiment is the same as the second verification experiment. In Example 5, the maximum value of the amplitude is 1 mm, in Example 6, the maximum value of the amplitude is 3 mm, in Comparative Example 4, the maximum value of the amplitude is 5 mm, and in Comparative Example 5, the maximum value of the amplitude is 7 mm. The result thereof is illustrated in Table 3.

TABLE 3

|  | Max. Value Of Amplitude (mm) | QR Code Readability |
|---|---|---|
| Example 5 | 1 | ⊚ |
| Example 6 | 3 | ○ |
| Comparative Example 4 | 5 | X |
| Comparative Example 5 | 7 | X |

As can be seen from the second and the third verification experiments, in the case of recording a two-dimensional code such as a QR code on the thermosensitive recording label RL of the container C, there were differences reflected on reading performance depending on the amplitude of vibration in the Z-axis direction of the conveyor device 10. In addition, it has been found that the tolerable range of the amplitude is greater as the width of the thin line of the QR code is made wider. Thus, in recording a two-dimensional code, when the amplitude of vibration of the conveyor device 10 measured by the amplitude measurement device exceeds a threshold corresponding to the width of the thin line of the two-dimensional code, the conveyor device 10 may be temporarily stopped. When the amplitude of vibration of the conveyor device 10 measured by the amplitude measurement device exceeded the threshold corresponding to width of the thin line of the two-dimensional code, the conveyor device 10 may further convey the container C, which is the recording object, to a prescribed conveying destination. Furthermore, based on the amplitude of vibration measured by the amplitude measurement device, the width of the thin line of the two-dimensional code may be determined. Moreover, the conveyor device 10 may be configured such that the vibration of the conveyor device 10 is 2 mm or less by a vibration isolation device or the like.

Fourth Verification Experiment

In a fourth verification experiment, by conveying the container C at a conveying speed of 2 m/sec while applying vibration to the conveyor device 10 in the Z-axis direction as with the first verification experiment, a barcode for which the type of barcode is ITF was recorded at a line width of 0.25 mm on the thermosensitive recording label RL of the container C that is the recording object. Then, the printing evaluation of the recorded barcode was carried out. As for the direction of the barcode to be recorded, in Example 7, it is the direction orthogonal to the Z-axis direction (vibration direction of the container C), and in Comparative Example 6, it is the Z-axis direction. The printing evaluation on the barcode is standardized in ISO 15416. Overall grade C or higher was rated as "⊚", overall grade D was rated as "○", and overall grade F was rated as "x". The result thereof is illustrated in Table 4.

TABLE 4

|  | Bar Code Readability |
|---|---|
| Example 7 | ⊚ |
| Comparative Example 6 | X |

As can be seen from the fourth verification experiment, depending on the recording direction of the bars of the barcode, the vibration affects the barcode quality. In order to ensure the barcode quality, it is suggested to select the direction orthogonal to the vibration direction of the container C, as the recording direction of the bars of the barcode.

Fifth Verification Experiment

In a fifth verification experiment, except for the presence of power correction by setting the light-source temperature control of the laser light-emitting elements 41 by the cooling unit 50 at 25° C. when the environment temperature is set to 10° C., a barcode was recorded on the thermosensitive recording label RL of the container C that is the recording object, under the same condition as that of Example 7 in the fourth verification experiment. That is, in Example 8, the power correction of light source temperature for Example 7 is present, and in Comparative Example 7, the power correction of light source temperature for Example 7 is absent. Then, the result of the printing evaluation of the recorded barcode is illustrated in Table 5.

TABLE 5

|  | Power Correction Of Light Source Temperature | Bar Code Readability |
|---|---|---|
| Example 8 | Present | ◎ |
| Comparative Example 7 | Absent | ○ |

As can be seen from the fifth verification experiment, performing the power correction by the light-source temperature control of the laser light-emitting elements 41 affects the barcode quality. In order to ensure the barcode quality, the power correction by the light-source temperature control of the laser light-emitting elements 41 is needed.

First Modification

Figure 6A:
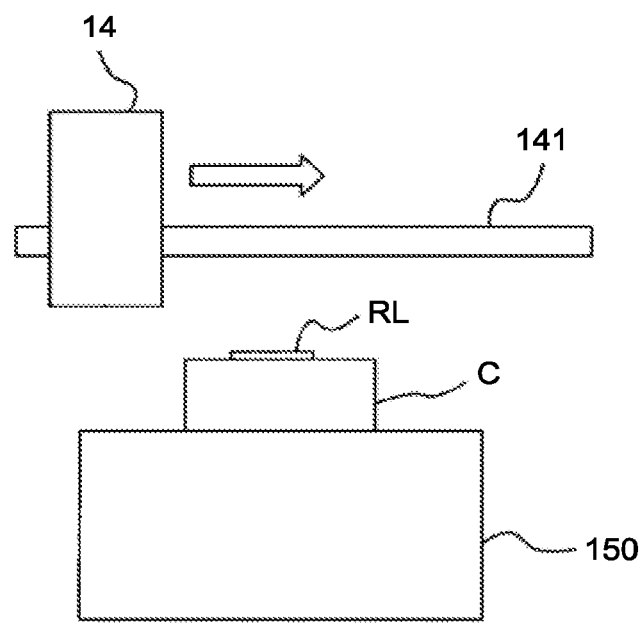
FIG. 6A is a diagram illustrating one example of an image recording system according to a first modification.
Figure 6B:
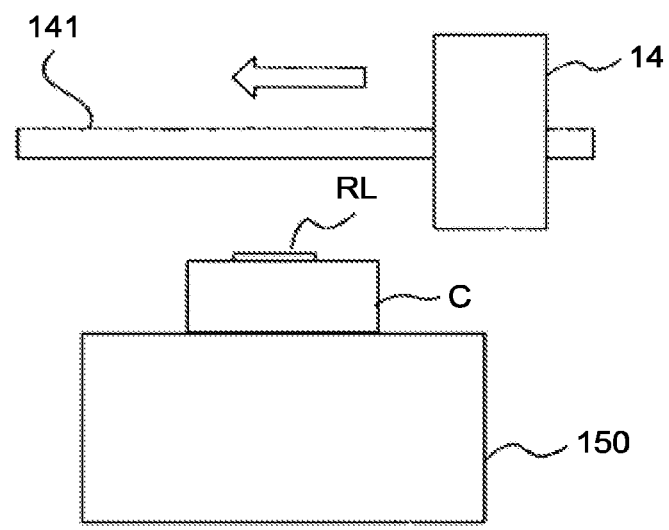
FIG. 6B is a diagram illustrating one example of the image recording system in the first modification.

FIGS. 6A and 6B are diagrams illustrating one example of the image recording system 100 according to a first modification. In the first modification, by moving the recording device 14, an image is recorded on the thermosensitive recording label RL of the container C that is the recording object.

As illustrated in FIGS. 6A and 6B, the image recording system 100 of the first modification includes a placing table 150 on which the container C is placed. The recording device 14 is supported on a rail member 141 so as to be movable in the left-and-right direction in FIGS. 6A and 6B.

In the first modification, the operator first sets the container C on the placing table 150 such that the surface on which the thermosensitive recording label RL that is the recording object of the container C is pasted up becomes the upper surface. Upon setting the container C on the placing table 150, by operating the operation panel 181, image recording processing is made to start. When the image recording processing is started, the recording device 14 located on the left-hand side illustrated in FIG. 6A moves toward the right-hand side in the drawing as indicated by the arrow in FIG. 6A. Then, the recording device 14 irradiates the recording object (thermosensitive recording label RL of the container C) with a laser beam and records an image while moving toward the right-hand side in FIG. 6A. After recording the image, the recording device 14 located on the right-hand side illustrated in FIG. 6B moves toward the left-hand side in the drawing as indicated by the arrow in FIG. 6B, and it returns to the location illustrated in FIG. 6A.

In the foregoing, the example in which the present invention was applied to the recording device 14 that records an image on the thermosensitive recording label RL pasted up on the container C has been described. However, the present invention can also be applied to an image rewriting system that rewrites an image on a reversible thermosensitive recording label pasted up on the container C, for example. In this case, on the upstream side of the recording device 14 in the conveying direction of the container C, an erasing device that irradiates the reversible thermosensitive recording label with a laser beam and erases the image recorded on the reversible thermosensitive recording label is provided. After erasing the image recorded on the reversible thermosensitive recording label by the erasing device, an image is recorded by the recording device 14. In such an image rewriting system, by using the fiber-array recording apparatus illustrated in the previous FIG. 2 as the recording device 14, it is possible to provide an apparatus of high productivity.

The foregoing is merely an example, and each of the following aspects has specific effects.

First Aspect

A laser emitting device that emits laser beams emitted from a plurality of laser light-emitting elements; an optical fiber array that includes a plurality of optical fibers that are provided corresponding to the laser light-emitting elements and guide laser beams emitted from the laser light-emitting elements to a recording object that relatively moves with respect to the laser emitting device, laser emitting portions of the respective optical fibers being arrayed in an array form in a predetermined direction; and an image recording unit that heats the recording object and records an image thereon by controlling the laser emitting device so as to irradiate the recording object which relatively moves with respect to the laser emitting device in a direction different from the predetermined direction, with laser beams via the optical fiber array, are provided.

According to the first aspect, by having the optical fiber array, the laser emitting portions 42a of the respective optical fibers only need to be arranged such that the pitch of the main-scanning direction of image dots formed on the recording object becomes a predetermined pitch, and it is possible to widen the pitch interval of the laser light-emitting elements of the laser array. Thus, it is possible to make the interval between the laser light-emitting elements be a sufficient interval that allows the heat of the laser light-emitting elements to escape, and it is possible to suppress the rise in temperature of the laser light-emitting elements. Accordingly, it is possible to restrain the wavelength and optical output of the laser light-emitting elements from fluctuating, and it is possible to record a satisfactory image on the recording object.

Second Aspect

In the first aspect, the predetermined direction is a direction orthogonal to a relative moving direction of the recording object.

Accordingly, it is possible to emit the laser beams emitted from the respective laser light-emitting elements toward locations different from one other in the direction orthogonal to the relative moving direction of the recording object, and it is possible to record an image on the recording object while relatively moving the recording object with respect to the laser emitting device such as the recording device 14.

Third Aspect

In the first aspect or the second aspect, a recording-object conveying unit that conveys the recording object is further provided, and the image recording unit records an image by irradiating the recording object with laser beams while controlling the conveyance of the recording object by the recording-object conveying unit.

According to this, as compared with a case in which a visible image is recorded on a recording object by temporarily stopping the recording object such as the container C and moving a laser emitting device such as the recording device 14, it is possible to increase the productivity.

Fourth Aspect

In any one of the first aspect to the third aspect, the image recording unit records an image on the recording object while amplitude of vibration of the recording object such as the container C is equal to or less than a threshold.

According to this, as has been described in the embodiment, it is possible to satisfactorily record characters and a two-dimensional code such as a QR code.

Fifth Aspect

In the fourth aspect, the image recording unit records an image on the recording object while amplitude of vibration of the recording object is equal to or less than a threshold when recording at least one of a character and a two-dimensional code such as a QR code on the recording object such as the container C.

According to this, as has been described in the embodiment, it is possible to satisfactorily record characters and a two-dimensional code such as a QR code.

Sixth Aspect

In the fourth aspect or the fifth aspect, an amplitude measurement unit such as an amplitude measurement device that measures amplitude of vibration in a direction orthogonal to a conveying direction of the recording-object conveying unit is further provided, and the image recording unit records an image on the recording object, based on a measurement result of the amplitude measurement unit.

According to this, as has been described in the embodiment, it is possible to prevent the image from being recorded by stopping the device and the like when the amplitude measured by the amplitude measurement unit is more than a threshold in recording characters and a two-dimensional code such as a QR code. Accordingly, it is possible to prevent illegible characters and a two-dimensional code such as a QR code from being recorded.

Seventh Aspect

In the sixth aspect, the image recording unit stops the recording-object conveying unit, when amplitude measured by the amplitude measurement unit such as an amplitude measurement device is more than the threshold.

According to this, it is possible to prevent illegible characters and a two-dimensional code such as a QR code from being recorded.

Eighth Aspect

In any one of the fourth aspect to the seventh aspect, the image recording unit sets the threshold based on a line width of a two-dimensional code when recording the two-dimensional code such as a QR code on the recording object.

Accordingly, as has been described in the embodiment, it is possible to restrain a two-dimensional code of a low grade from being recorded.

Ninth Aspect

In the fourth aspect, the image recording unit, when recording a barcode on the recording object, records an image based on image information according to which bars of the barcode are to be recorded on the recording object in a direction orthogonal to a conveying direction of the recording-object conveying unit.

Accordingly, in the image recording system 100 that records a barcode on the container C that is the recording object, even when the vibration occurs on the container C in conveying by the conveyor device 10, it is possible to reduce the influence of vibration on the quality of the image recorded on the thermosensitive recording label RL.

Tenth Aspect

In any one of the first aspect to the ninth aspect, the image recording unit corrects optical output by controlling irradiation power of the laser beam depending on temperature of the laser light-emitting elements.

According to this, it is possible to correct and suppress the fluctuation of the optical output of the laser light-emitting elements by temperature, it is possible to record a satisfactory image on the recording object, and it is possible to prevent illegible characters and a two-dimensional code such as a QR code from being recorded.

Eleventh Aspect

In an image recording method in an image recording apparatus including a laser emitting device that emits laser beams emitted from a plurality of laser light-emitting elements, and an optical fiber array that includes a plurality of optical fibers that are provided corresponding to the laser light-emitting elements and guide laser beams emitted from the laser light-emitting elements to a recording object that relatively moves with respect to the laser emitting device, laser emitting portions of the respective optical fibers being arrayed in an array form in a predetermined direction, the image recording method includes a step of heating the recording object and recording an image thereon by controlling, by an image recording unit, the laser emitting device so as to irradiate the recording object, which relatively moves in a direction different from the predetermined direction with respect to the laser emitting device, with laser beams via the optical fiber array.

According to this, as has been described in the embodiment, by utilizing the optical fiber array, the laser emitting portions of the respective optical fibers only need to be arranged such that the pitch of the main-scanning direction of image dots formed on the recording object becomes a predetermined pitch, and it is possible to widen the pitch interval of the laser light-emitting elements of the laser array. Thus, it is possible to make the interval between the laser light-emitting elements be a sufficient interval that allows the heat of the laser light-emitting elements to escape, and it is possible to suppress the rise in temperature of the laser light-emitting elements. Accordingly, it is possible to restrain the wavelength and optical output of the laser light-emitting elements from fluctuating, and it is possible to record a satisfactory image on the recording object.

The image recording apparatus according to an embodiment provides an effect that the temperature rise of the laser light-emitting element can be suppressed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

REFERENCE SIGNS LIST

10 CONVEYOR DEVICE
11 SHIELDING COVER
14 RECORDING DEVICE
14a LASER ARRAY UNIT
14b FIBER ARRAY UNIT
15 READING DEVICE
18 SYSTEM CONTROL DEVICE
41 LASER LIGHT-EMITTING ELEMENT
42 OPTICAL FIBER
42a LASER EMITTING PORTION
43 OPTICAL UNIT
43a COLLIMATOR LENS
43b CONDENSER LENS
44 ARRAY HEAD
45 DRIVER
46 CONTROLLER
47 IMAGE-INFORMATION OUTPUT UNIT
48 POWER SOURCE
50 COOLING UNIT
51 HEAT RECEIVING UNIT
52 HEAT DISSIPATION UNIT
53a COOLING PIPE
53b COOLING PIPE
100 IMAGE RECORDING SYSTEM
141 RAIL MEMBER
150 PLACING TABLE
181 OPERATION PANEL
C CONTAINER
P PITCH OF OPTICAL FIBER IN Z-AXIS DIRECTION (LASER IRRADIATION PITCH)
RL THERMOSENSITIVE RECORDING LABEL

What is claimed is:

1. An image recording apparatus, comprising:
a laser emitting device configured to emit laser beams emitted from a plurality of laser light emitters;
an optical fiber array including a plurality of optical fibers provided corresponding to the plurality of laser light emitters, the plurality of optical fibers configured to guide the laser beams emitted from the plurality of laser light emitters to a recording object that relatively moves with respect to the laser emitting device, and laser emitting portions of respective optical fibers of the plurality of optical fibers are arrayed in an array formed in a predetermined direction; and
a control circuit configured to control the laser emitting device to irradiate the recording object, which relatively moves with respect to the laser emitting device in a direction different from the predetermined direction, with laser beams via the optical fiber array to heat the recording object and to record an image, wherein
the control circuit records the image on the recording object while an amplitude of vibration of the recording object is equal to or less than a threshold.

2. The image recording apparatus according to claim 1, wherein the predetermined direction is a direction orthogonal to a relative moving direction of the recording object.

3. The image recording apparatus according to claim 1, further comprising:
a recording-object conveying device configured to convey the recording object, wherein
the control circuit is configured to control the laser emitting device irradiate the recording object with laser beams, to record an image while controlling conveyance of the recording object by the recording-object conveying device.

4. The image recording apparatus according to claim 3, wherein the control circuit is configured to stop the recording-object conveying device when the amplitude is more than the threshold.

5. The image recording apparatus according to claim 3, wherein the control circuit is configured to, when recording a barcode on the recording object, record the image based on image information according to which bars of the barcode are to be recorded on the recording object in a direction orthogonal to a conveying direction of the recording-object conveying device.

6. The image recording apparatus according to claim 1, wherein the control circuit is configured to control the laser emitting device to record the image on the recording object while the amplitude of the vibration of the recording object is equal to or less than the threshold when recording at least one of a two-dimensional code and a character on the recording object.

7. The image recording apparatus according to claim 1, further comprising:
an amplitude measurement device configured to measure the amplitude of the vibration in a direction orthogonal to a conveying direction of the recording-object conveying device, wherein
the control circuit is configured to record the image on the recording object, based on a measurement result of the amplitude measurement device.

8. The image recording apparatus according to claim 1, wherein the control circuit is configured to set the threshold based on a line width of a two-dimensional code when recording the two-dimensional code on the recording object.

9. The image recording apparatus according to claim 1, wherein the control circuit is configured to control an irradiation power of the laser beams according to a temperature of the laser light emitters.

10. An image recording method in an image recording apparatus including a laser emitting device configured to emit laser beams emitted from a plurality of laser light emitters, and an optical fiber array including a plurality of optical fibers provided corresponding to the plurality of laser light emitters, the plurality of optical fibers configured to guide the laser beams emitted from the plurality of laser light emitters to a recording object that relatively moves with respect to the laser emitting device, and laser emitting portions of respective optical fibers of the plurality of optical fibers are arrayed in an array formed in a predetermined direction, the image recording method comprising:

controlling, by a control circuit the laser emitting device se as to irradiate the recording object, which relatively moves in a direction different from the predetermined direction with respect to the laser emitting device, with laser beams via the optical fiber array to heat the recording object and to record an image, wherein recoding the image on the recording object is performed while an amplitude of vibration of the recording object is equal to or less than a threshold.

* * * * *